Nov. 1, 1927.

A. C. RUMBLE 1,647,251

SPLICE HEAD FOR ELECTRIC CABLES

Filed Nov. 19, 1925

INVENTOR,
Alex C. Rumble,
By Martin P. Smith, Atty.

Patented Nov. 1, 1927.

1,647,251

UNITED STATES PATENT OFFICE.

ALEX C. RUMBLE, OF LOS ANGELES, CALIFORNIA.

SPLICE HEAD FOR ELECTRIC CABLES.

Application filed November 19, 1925. Serial No. 70,065.

My invention relates to an improved splice head for electric cables and has for its principal objects the provision of relatively simple, practical and easily assembled means for splicing electric current-carrying cables, and which splicing means is primarily designed to eliminate much of the time, labor and consequent expense that is incident to the wiped lead joints ordinarily employed in splicing or connecting the adjacent ends of electric cables.

Further objects of my invention are to provide a spliced head of the character referred to that may be readily assembled or taken apart and which head is effective in thoroughly insulating the connected portions of the cables.

With the foregoing and other objects in view, my invention consists in certain novel features of construction and arrangement of parts that will hereinafter be more fully described and claimed and illustrated in the accompanying drawing, in which—

Figure 1:
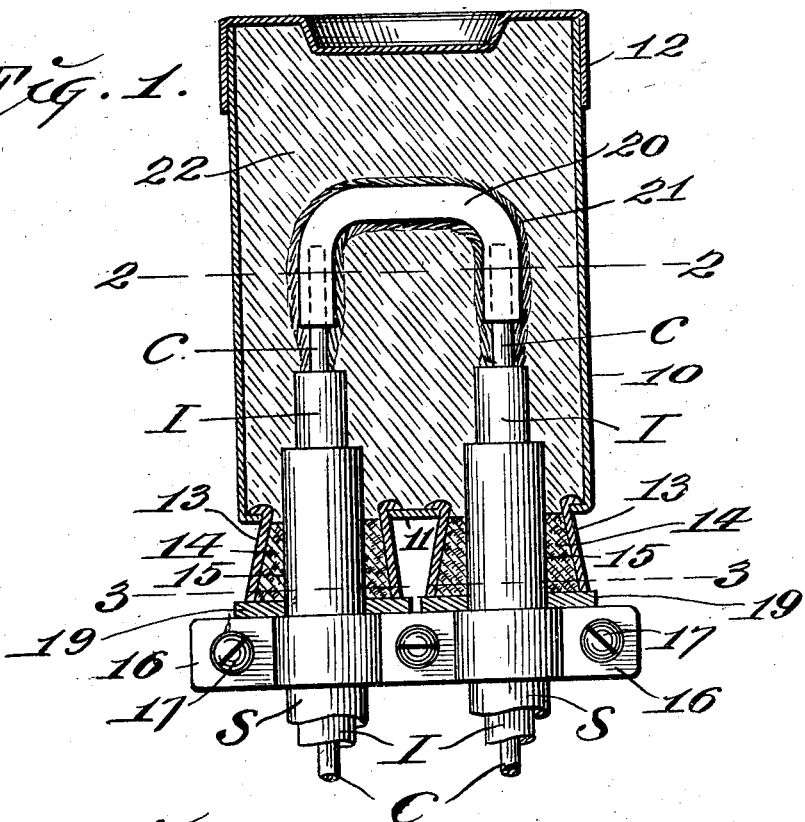
Fig. 1 is a vertical section taken lengthwise through the center of an electric cable splice head of my improved construction.
Figure 2:
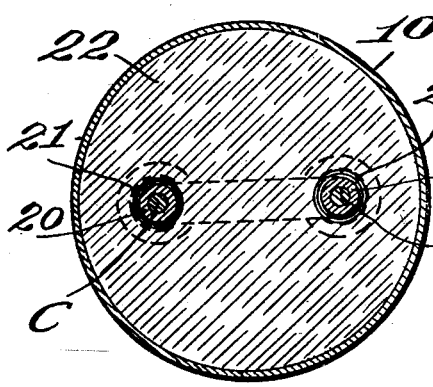
Fig. 2 is a horizontal section taken on the line 2—2 of Fig. 1.
Figure 3:
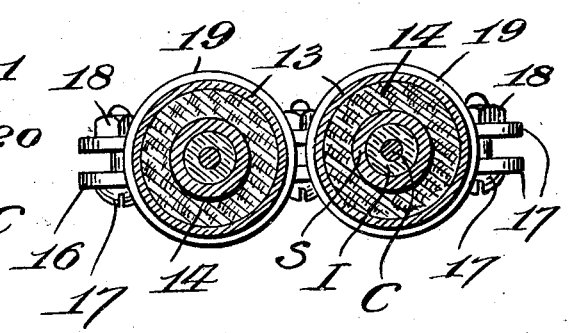
Fig. 3 is a horizontal section taken on the line 3—3 of Fig. 1.

Referring by numerals to the accompanying drawing which illustrates a practical embodiment of my invention, 10 designates a hollow cylindrical shell or casing, preferably formed of noncorrodable metal such as copper, the lower end of said shell being closed by an integral plate 11, and the upper end being closed by a detachable cap 12 of copper or like metal.

Secured to the bottom plate 11 and spaced apart on opposite sides of the center thereof are depending rings or shells 13 of copper or the like and which gradually increase in diameter toward their lower ends. These rings or shells serve as retainers for plugs 14, preferably of cork or analogous material and said plugs being provided with axially disposed perforations 15 for the accommodation of the lead sheaths S of the cables. These cables are of the standard type and the lead sheaths S enclose the usual fabric insulation I and which latter jackets the conductors C.

The cables immediately below the splice head are firmly secured to each other and maintained in spaced relation by a pair of clamping plates 16 through which pass screws or bolts 17 that are provided on their threaded ends with nuts 18. These clamping plates are arranged on the cables immediately beneath the lower ends of the rings or shells 13 and interposed between the lower ends of said rings or shells and the upper edges of the clamping plates are washers 19 of lead or the like. Thus the shell or casing 10 is grounded to the sheaths S of the cables through the rings or shells 13, lead washers 19 and clamping plates 16. The cork plugs 14, after being applied to the ends of the sheaths S of the cables, are forced into the rings or shells 13, thereby providing air and moisture proof plates between the lower portion of the head and the cable sheaths.

The cables that are spliced by means of my improved head extend a short distance upwardly into shell or housing 10 and the exposed projecting ends of the conductors C are electrically connected by means of a short tubular member 20 of copper or analogous material that is bent into inverted U-shape and the ends of the conductors occupying the vertically disposed legs of said U-shaped connectors.

After the connector 20 has been secured to the ends of the cables, the exposed surfaces of the latter and the connector 20 are preferably wrapped with cambric tape or the like to provide a moisture proof insulation 21. The splice is completed by filling the shell or casing 10 with a suitable insulating compound 22 and which latter may be any one of a number of well known insulating compounds that are readily obtainable in the open market.

After the shell has thus been filled with the insulating compound, cap 12 is secured in position on top of said shell and the splice is completed.

Thus it will be seen that I have provided an electric cable splice head that is relatively simple in structure, capable of being easily and cheaply produced and which, in addition to providing a very positive connection between the cables, thoroughly insulates the metal portions of the head from the current conductors. Further, by constructing the main portions of the splice head of copper and lead, deterioration as a result of corrosion of the head and enclosed parts is minimized.

Heretofore, it has been the general practice to splice electric cables by means of a wiped lead joint and which practice involves considerable time, labor and expense. A splice head of my improved construction may be easily and quickly applied and if ordinary care is taken when the head is removed from the joint or splice when the latter is broken, said head may be re-used, thus providing an economical advantage.

It will be understood that minor changes in the size, form and construction of the various parts of my improved splice head for electric cables may be made and substituted for those herein shown and described without departing from the spirit of my invention, the scope of which is set forth in the appended claims.

I claim as my invention:

1. In a splice head for electric cables comprising a metal shell, a pair of short tubular members depending from the bottom of said shell, ring-shaped plugs of compressible material arranged in said depending tubular members, which ring-shaped plugs are adapted to receive a pair of cables, each of the latter having a conductor, a portion of the end of which within the shell is exposed, a member connecting the exposed ends of the conductors and a body of insulating material within said shell and wholly enclosing the exposed portions of the conductors and said connecting member.

2. A splice head for electric cables comprising a metal shell provided in its lower portion with a pair of openings for the reception of cables, a short tubular member secured in each opening and depending from the bottom of said shell, ring-shaped plugs of compressible material positioned in the depending tubular members and surrounding the cables that extend into said shell, a member within said shell and connected ends of the conductors that are carried by said cables, fabric insulation covering the exposed portions of said conductors and said connecting member and body of insulating material occupying said shell and wholly enclosing said connecting member and the ends of the cables that project into said shell.

3. A splice head for electric cables comprising a metal shell provided in its lower portion with a pair of openings for the reception of cables, ring-shaped plugs of compressible material positioned in the depending tubular members and surrounding the cables that extend into said shell, a member within said shell and connected ends of the conductors that are carried by said cables, fabric insulation covering the exposed portions of said conductors, said connecting member and body of insulating material occupying said shell and wholly enclosing said connecting member and the ends of the cables that project into said shell and spacing clamps arranged on the cables beneath said splicing head.

4. The combination with a pair of conductor carrying cables of means for maintaining said cables in spaced relation and electrically connecting the sheaths of said cables, a casing of metal surrounding the ends of the cables that are engaged by said connecting and spacing means, tubular members secured to and depending from the casing said cables extending into the casing through said tubular members, ring-shaped plugs of compressible material arranged in said depending tubular members and surrounding the cables that pass therethrough, washers arranged on said cables below the lower ends of said depending tubular members and the means that electrically connects the sheaths of said cables, a member within said casing for connecting the ends of the conductors that are carried by said cables, a body of insulating material contained within the casing and wholly enclosing the conductor connecting member and the ends of the cables that project into said casing, and a cap closing the upper end of said casing.

In testimony whereof I affix my signature.

ALEX C. RUMBLE.